US009230189B2

(12) United States Patent
Robert et al.

(10) Patent No.: US 9,230,189 B2
(45) Date of Patent: Jan. 5, 2016

(54) METHOD OF RAINDROP DETECTION ON A VEHICLE WINDSCREEN AND DRIVING ASSISTANCE DEVICE

(75) Inventors: Caroline Robert, Paris (FR); Samia Ahiad, Gagny (FR); Xiyuan Zhang, Paris (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 676 days.

(21) Appl. No.: 13/582,566

(22) PCT Filed: Mar. 4, 2010
(Under 37 CFR 1.47)

(86) PCT No.: PCT/EP2010/001355
§ 371 (c)(1),
(2), (4) Date: Apr. 12, 2013

(87) PCT Pub. No.: WO2011/107118
PCT Pub. Date: Sep. 9, 2011

(65) Prior Publication Data
US 2015/0310304 A1    Oct. 29, 2015

(51) Int. Cl.
*G06K 9/00* (2006.01)
*G06K 9/52* (2006.01)
*G06K 9/46* (2006.01)
*B60R 1/00* (2006.01)

(52) U.S. Cl.
CPC ... *G06K 9/52* (2013.01); *B60R 1/00* (2013.01); *G06K 9/00791* (2013.01); *G06K 9/46* (2013.01); *G06K 9/4604* (2013.01); *G06K 9/4652* (2013.01); *G06K 2009/4666* (2013.01)

(58) Field of Classification Search
USPC ........................................................ 382/104
See application file for complete search history.

(56) References Cited

U.S. PATENT DOCUMENTS

| 6,555,804 | B1* | 4/2003 | Blasing | B60S 1/0822 250/208.1 |
| 8,797,417 | B2* | 8/2014 | Gayko | G06T 5/005 348/154 |
| 2004/0200948 | A1 | 10/2004 | Bos et al. | |
| 2005/0206511 | A1* | 9/2005 | Heenan | B60S 1/0822 340/438 |
| 2006/0228001 | A1 | 10/2006 | Tsukamoto | |
| 2007/0093949 | A1 | 4/2007 | Stam et al. | |
| 2007/0267993 | A1* | 11/2007 | Leleve | B60S 1/0822 318/483 |
| 2007/0272884 | A1* | 11/2007 | Utida | B60S 1/0822 250/573 |

FOREIGN PATENT DOCUMENTS

| DE | 10 2007 057745 A1 | 6/2009 |
| EP | 1 790 541 A2 | 5/2007 |
| EP | 1 860 426 A2 | 11/2007 |
| EP | 1 923 280 A1 | 5/2008 |

OTHER PUBLICATIONS

International Search Report from PCT/EP2010/001355 mailed Oct. 22, 2010 (3 pages).
Written Opinion from PCT/EP2010/001355 mailed Oct. 22, 2010 (5 pages).

* cited by examiner

*Primary Examiner* — Gregory F Cunningham
(74) *Attorney, Agent, or Firm* — Osha Liang LLP

(57) ABSTRACT

The invention relates to a method of raindrop detection on a vehicle windscreen by capturing images using a camera which is at least focused on the windscreen, including a step of detecting edges (102) in a research area of said captured images, characterized in that said method of raindrop detection comprises a rejection step (103) in which edges that are uncharacteristic with respect to a raindrop are rejected. This invention also relates to an associated driving assistance device.

12 Claims, 3 Drawing Sheets

Figure 1:
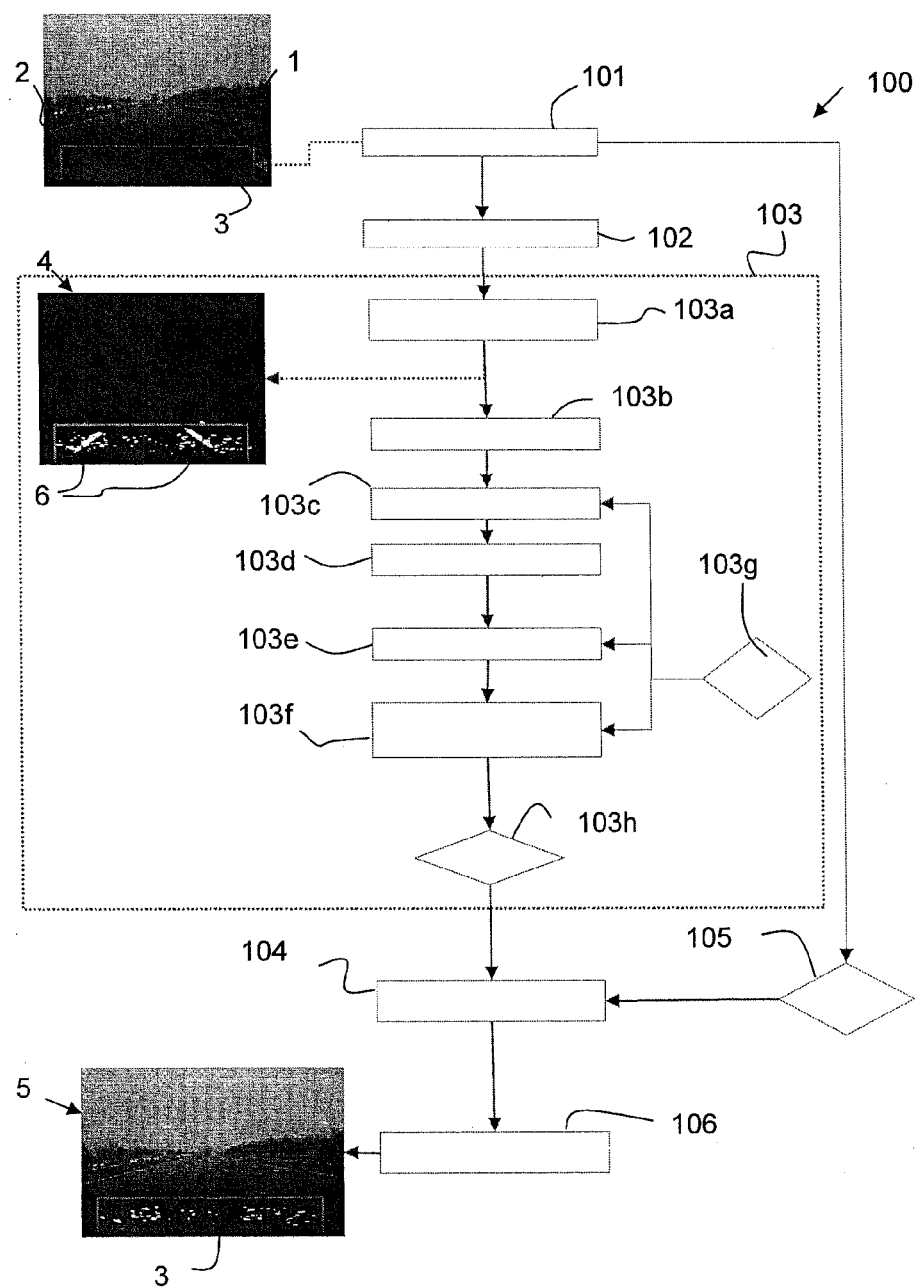

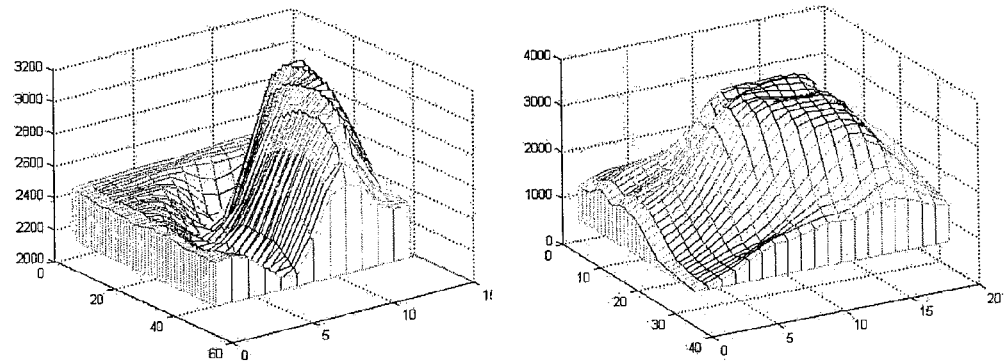
FIG. 4a  FIG. 4b
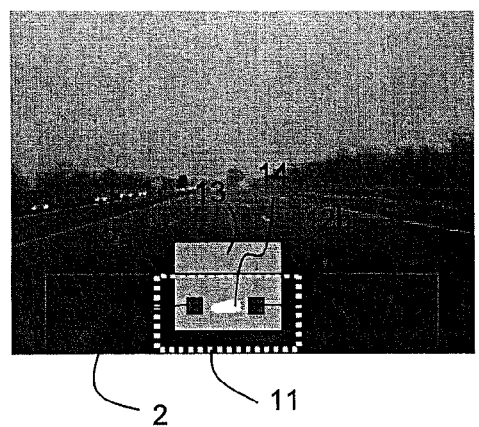
FIG. 5

METHOD OF RAINDROP DETECTION ON A VEHICLE WINDSCREEN AND DRIVING ASSISTANCE DEVICE

The invention relates to a method of raindrop detection on a vehicle windscreen by processing images, particularly in order to trigger the automatic control of a functionality of the vehicle, particularly that of the windscreen wipers.

In motor vehicles, several driving assistance systems are known, using images captured by a single or by several cameras.

The images obtained can be processed to allow a display on screens, for example at the dashboard or projected on the windscreen, in particular to alert the driver in the case of danger or simply to improve his visibility. The images can also make it possible to detect raindrop or fog on the windscreen. These images can participate in the automatic triggering of a functionality of the vehicle (alert to the driver, automatic triggering of braking, automatic triggering of the windscreen wipers in the case of the display of drops of water on the windscreen, visual or audible warning, control of certain functions of the headlight, etc).

Image processing techniques aimed at detecting raindrops generally require that the camera is focused on the windscreen. Then, techniques have been elaborated to detect the presence of raindrop from information contained in these captured images.

An object of the invention is to propose an improved method of raindrop detection requiring less computation time and less memory capacities.

In a first aspect of the present invention, this object is achieved by a method of raindrop detection on a vehicle windscreen by capturing images using a camera which is at least focused on the windscreen, including a step of detecting edges in a research area of said captured images, characterized in that said method of raindrop detection comprises a rejection step in which edges that are uncharacteristic with respect to a raindrop are rejected.

Indeed, the study of the morphology of droplets on windscreens has shown that droplets deposited on a windscreen had specific shape or characteristic luminance properties enable to reject edges that are not raindrop edges.

In a further embodiment, said rejection step includes a stage in which closed edges are selected while unclosed edges are rejected. Indeed, the raindrop edge shape, elliptic or approximately round, is characteristic to the droplets.

Said rejection step may include one or more of the following stages:
 a stage where connected components are extracted,
 a stage in which extracted connected components that have geometric criteria different from raindrop ones are rejected,
 a stage in which extracted connected components that are inclined over a predetermined angle threshold are rejected,
 a stage in which extracted connected components showing a grey level variation different from the raindrop grey level variation having one minimum and one maximum, are rejected,
 a stage in which extracted connected components having a predetermined pixels number with a grey level higher than a predetermined grey level threshold are rejected,
 a stage in which if more than two extracted connected components are rejected during said stage where extracted connected components having a predetermined pixels number with a grey level higher than a predetermined grey level threshold are rejected, within a predetermined distance threshold in a critical research area, extracted connected components between them are rejected.

In a further embodiment, extracted connected components are rejected only if the vehicle speed is bellow a predetermined speed threshold. Indeed, at low speed, raindrop which fall on the windscreen show nice curves that can be well interpreted.

Said method of raindrop detection may further include a tracking step in which each extracted connected components in a current captured image is tracked in next captured image doing a comparison between the extracted connected components grey level and the grey level of corresponding position in the next captured image.

This method allows a well distinguishing between raindrop and other spots such as lines or lamps without requiring a lot of calculation time or important resources.

The invention also relates to a method of raindrop detection on a vehicle windscreen by capturing images using a camera which is at least focused on the windscreen, including a step of detecting edges in a research area of said captured images, characterized in that said method of raindrop detection comprises a rejection step in which edges that are uncharacteristic with respect to a raindrop are rejected, this rejection step comprises at least the following sequence:
 a first stage where closed edges are selected while unclosed edges are rejected,
 a second stage where among the remaining selected closed edges, connected components are extracted,
 a third stage where among the extracted connected components, extracted connected components that have geometric criteria different from raindrop ones are rejected,
 a fourth stage where among the extracted connected components, extracted connected components that are inclined over a predetermined angle threshold are rejected,
 a fifth stage where among the extracted connected components, extracted connected components showing a grey level variation different from the raindrop grey level variation having one minimum and one maximum, are rejected,
 a sixth stage where among the extracted connected components, extracted connected components having a predetermined pixels number with a grey level higher than a predetermined grey level threshold are rejected, and then
 a seventh stage where among the extracted connected components rejected by said sixteen stage, if more than two extracted connected components are rejected within a predetermined distance threshold in a critical research area, extracted connected components between them are rejected.

This particular stage order leads to optimize the rejection of closed edges reducing time calculation.

The invention further relates to a driving assistance device comprising:
 a camera for being mounted onboard a vehicle and which is at least focused on the windscreen, and
 processing means configured to capture images from said camera and to generate at least one signal indicative of the presence of raindrop on the windscreen from information contained in the captured images, and configured to detect edges in the captured images,
characterized in that the processing means are further configured to reject edges that are uncharacteristic with respect to a raindrop.

According to an embodiment, said camera comprises a bifocal objective providing a first zone that is focused to infinity and a second zone focused on the windscreen to detect raindrop.

Other features and advantages of the invention will become apparent from the following description of a non-limited example and enclosed drawings.

Figure 2:
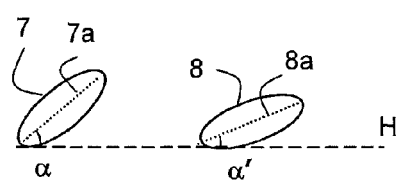
Figure 3A:
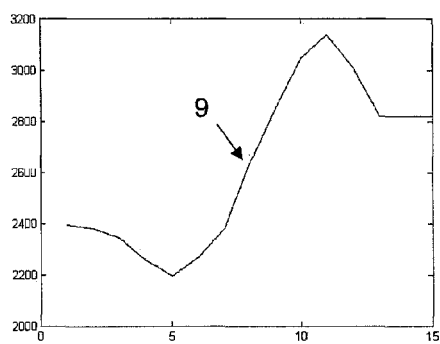
Figure 3B:
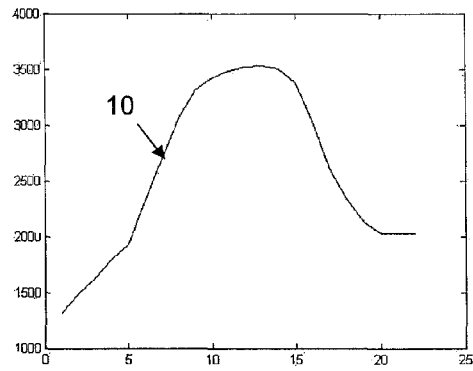

For a better understanding of the invention with regard to the embodiments thereof, reference is made to the accompanying drawings, in which like numerals designate corresponding elements or sections throughout, and in which:

FIG. 1 is a flowchart of an example of a method of raindrop detection on a windscreen, FIG. 2 shows an example of two schematic closed edges, a first selected raindrop closed edge and a second rejected lane closed edge, FIG. 3a is a graphic of the luminance of a selected raindrop closed edge, FIG. 3b is a graphic similar to FIG. 3a for a rejected lamp closed edge, FIG. 4a is a 3D representation of the selected raindrop closed edge of FIG. 3a, FIG. 4b is a 3D representation of the rejected lamp closed edge of FIG. 3b, and FIG. 5 is an image captured by a camera where three rejected closed edges have been represented.

The driving assistance device comprises a camera mounted onboard a motor vehicle.

The camera is installed in the cab interior of the vehicle, opposite a "wipable" zone of the vehicle windscreen, that is to say a zone which is swept by one of the wiper blades while in operation. The camera takes successive images of the road in front of the vehicle through the vehicle windscreen. For example, the camera is mounted behind the windscreen wiped area, at approximately ten to twenty centimeters from it.

As used herein, the term "camera" is used to designate any device for acquiring images of the camera type (more particularly the CCD ("charge coupling sensor"s) or CMOS (Complementary Metal Oxide Semiconductor) type) or photosensitive sensor, for example a black and white sensor or a color sensor. The camera is generally sensitive in the visible range and/or in the infrared range, in particular in the near infrared.

According to an embodiment of the driving assistance device, the camera comprises a bifocal (or multi-focal) objective providing a first zone 2 that is focused to infinity and a second zone 3 focused on the windscreen (image 1 on FIG. 1).

It is thus possible to capture images in the distance with the adapted focal distance, and close by with a shorter focal distance. Therefore methods of detecting fog, lane edges or road verges, or detecting pedestrians or obstacles, will be able to use the portions of images captured at distance by the sensor, sufficiently sharp by virtue of the zone of the objective focused to infinity and the method of raindrop detection will be able to use the portions of images taken at a very short distance, on the windscreen, through the zone of the objective focused on the windscreen.

The driving assistance device also comprises processing means configured to:
capture images from said camera,
generate at least one signal indicative of the presence of raindrop on the windscreen from information contained in the captured images, and
detect edges in the captured images.

The processing means are further configured to implement a method of raindrop detection on a vehicle windscreen 100 (FIG. 1) using captured images by the camera focused on the windscreen. By raindrop, we may include rain, snow, mud or other forms of obscuring media that may fall upon the windscreen.

Said method of raindrop detection 100 comprises the following steps.

A first step 101 in which a research area is defined in the second zone 3 on said captured images. This research area may be situated in the lower part of the windscreen wiped area corresponding to the road images (image 1 on FIG. 1).

The method of raindrop detection 100 comprises a second step 102 where edges are detected in said research area. In non-limiting examples, edge detection methods such as the Sobel, Prewitt, Roberts, Zero-cross, Canny methods etc. can be used.

The method of raindrop detection 100 also comprises a rejection step 103 in which edges that are uncharacteristic with respect to a raindrop are rejected. Indeed, the study of the morphology of droplets on windscreens has shown that droplets deposited on a windscreen had specific shape or characteristic luminance properties enable to reject edges that are not raindrop edges.

In a first stage 103a of this rejection step 103, closed edges are selected while unclosed edges are rejected. Indeed, the raindrop edge shape, elliptic or approximately round, is characteristic to the droplets.

A binary image resulting from this first stage 103a is represented on image 4 on FIG. 1. In this binary image 4, each selected closed edges are represented in white.

The rejection step 103 may further include a stage 103b following by one or more of the stages 103c, 103d, 103e, 103f or 103h.

In stage 103b, connected components are extracted.

This stage 103b uses classical image processing algorithm based on graphic theory. For each pixel, the algorithm checks value neighbors to isolate or merge pixels in the captured image research area. This stage 103b allows creating labels of connected components, for example labels 6 correspond to lanes spots (image 4).

In stage 103c, selected closed edges (also referred as "extracted connected components" or "labeled components") that have geometric criteria different from raindrop ones are rejected.

For example, if the closed edge height is higher than the closed edge width, then said closed edge is rejected. In another example, if the closed edge height is lower than 2 pixels or if the closed edge width is lower than 3 pixels, then the closed edge is rejected. In a further example, if the closed edge size is higher than ⅓ of the research area, then the closed edge is rejected.

In stage 103d, selected closed edges (also referred as "extracted connected components" or "labeled components") that are inclined bellow a predetermined angle threshold, such as bellow 45°, are selected while closed edges that are inclined over said predetermined angle are rejected.

The angle of the selected closed edges is taken between the closed edge major axis and the horizontal. Closed edges showing an inclination over said predetermined angle threshold are characteristic of lane closed edges.

An example is shown in FIG. 2. The first closed edge 7 is a lane spot. It has a major axis 7a which forms an angle $\alpha$ of 45° with the horizontal H. This angle $\alpha$ is equal to the predetermined angle threshold of 45°. Instead, the second closed edge 8 is a raindrop spot. It has a major axis 8a which forms an angle $\alpha'$ with the horizontal H bellow to 45°. This angle $\alpha'$ is lower than the predetermined angle threshold. Thus, closed edge 7 is rejected while closed edge 8 is selected.

In stage 103e, closed edges (also referred as "extracted connected components" or "labeled components") showing a grey level variation different from the raindrop grey level variation having one minimum and one maximum, are rejected.

The grey level variation (or profile) is obtained from a line of the closed edge, took for example in the middle of said closed edge. The raindrop profile presents a dark/light and a light/dark transitions, which are characteristic. However, closed edges showing only one extreme are characteristic of lamp.

FIGS. 3a and 3b show two examples of grey level profiles according a pixel line in a raindrop closed edge (FIG. 3a) and in a lamp closed edge (FIG. 3b). In FIG. 3a, the grey level profile 9 has two extremes, a minimum and a maximum. In FIG. 3b, the lamp grey level profile 10 has only one maximum. Thus, closed edge 10 is rejected while closed edge 9 is selected.

In stage 103f, selected closed edges (also referred as "extracted connected components" or "labeled components") having a predetermined pixels number with a grey level higher than a predetermined grey level threshold are rejected.

Two examples are shown in FIGS. 4a and 4b. The predetermined grey level threshold is for example 2200.

In FIG. 4a, the pixel cumulated grey level value under this predetermined grey level threshold is 311 while the pixel cumulated grey level value over this predetermined grey level threshold is 90.

In FIG. 4b, the pixel cumulated grey level value under this predetermined grey level threshold is 257 while the pixel cumulated grey level value over this predetermined grey level threshold is 429.

Thus, closed edges of FIG. 4a having more pixels with a grey level lower than 2200 are selected while closed edges of FIG. 4b having more pixels with a grey level higher than 2200, are rejected.

Those stages 103c, 103e and 103f can be implemented in function of the vehicle speed. That is to say,
   closed edges that have geometric criteria different from raindrop ones,
   closed edges showing a grey level variation different from the raindrop grey level variation having one minimum and one maximum, and
   closed edges having a predetermined pixels number with a grey level higher than a predetermined grey level threshold,
are rejected only if the vehicle speed is bellow a predetermined speed threshold (103g).

The predetermined speed threshold is for example 10 km/h.

Indeed, at low speed, raindrop which fall on the windscreen show nice curves that can be well interpreted.

In stage 103h, if more than two closed edges (also referred as "extracted connected components" or "labeled components") are previously rejected by stage 103f within a predetermined distance threshold in a critical research area, selected closed edges between them are rejected. Indeed, theses closed edges may correspond to another vehicle taillight. An example is shown in FIG. 5.

The critical research area 11 may be the middle of the lower zone 2 on the windscreen wiped area. The two closed edges 12a, 12b corresponding to another vehicle 13 followed, have a predetermined pixels number with a grey level higher than a predetermined grey level threshold, so they have been rejected during stage 103f.

A supplementary red color condition or stop position of the vehicle may be applied.

Moreover, selected closed edge 14 between both rejected closed edges 12a, 12b are also rejected as they should correspond to the vehicle beam reflection backward on said ahead vehicle 13.

Said method of raindrop detection may further includes a tracking step 104 in which each selected closed edge (also referred as "extracted connected components" or "labeled components") in a current captured image is tracked in next captured image doing a comparison between the selected closed edge grey level and the grey level of corresponding position in the next captured image.

Indeed, from a current image n captured at t to a next image n+1 captured at t+1, each detected raindrop in the current captured image n can be tracked in the next captured image n+1, because the changing environment of a raindrop can prevent its detection by the edge detection mean.

This tracking step may calculate a ratio representing the difference between each last detected raindrop and its corresponding zone in actual image. The ratio can be for example an accumulator of absolute differences between each pixel grey level of a drop and its corresponding one in the actual image.

This tracking step 104 may be done only by low luminosity, such as by night (block 105). For example, this tracking step evaluates the mean of the captured images pixels. The comparison of that mean with a predetermined mean threshold gives an indication of the windscreen luminosity. During the day or with a high luminosity level, captured images are precise enough but during the night or at low luminosity level, the raindrop tracking may be useful. The raindrop tracking could then be submitted to this preliminary luminosity test.

In a last stage 106, the method can count the number of raindrop closed edges. Image 5 on FIG. 1 shows an illustration of the raindrop detected on zone 3.

The raindrop number allows carrying out an appropriate treatment in real time on the vehicle. For example, velocity and cycle of the vehicle's wipers are adapted in function of the rain condition.

This method allows a well distinguishing between raindrop and other spots such as lines or lamps without requiring a lot of calculation time or important resources.

According to further embodiment, the method of rain detection 100 implements the following sequence of stages:
   a first stage 103a where closed edges are selected while unclosed edges are rejected,
   a second stage 103b where among the remaining selected closed edges, connected components are extracted,
   a third stage 103c where among the extracted connected components, extracted connected components that have geometric criteria different from raindrop ones are rejected,
   a fourth stage 103d where among the extracted connected components, extracted connected components that are inclined over a predetermined angle threshold are rejected,
   a fifth stage 103e where among the extracted connected components, extracted connected components showing a grey level variation different from the raindrop grey level variation having one minimum and one maximum, are rejected,
   a sixth stage 103f where among the extracted connected components, extracted connected components having a predetermined pixels number with a grey level higher than a predetermined grey level threshold are rejected, and then
   a seventh stage 103h where among the extracted connected components rejected by said sixteen stage 103f, if more than two extracted connected components are rejected within a predetermined distance threshold in a critical research area, extracted connected components between them are rejected.

This particular stage order leads to optimize the rejection of closed edges reducing time calculation.

The invention claimed is:

1. A method of raindrop detection on a vehicle windscreen by capturing images using a camera which is at least focused on the windscreen, comprising:
   detecting edges in a research area of the images captured by the camera; and
   rejecting edges that are uncharacteristic with respect to a raindrop, wherein rejecting edges comprises selecting closed edges corresponding to raindrops shaped elliptically or substantially round and rejecting unclosed edges.

2. The method of raindrop detection according to claim 1, wherein rejecting edges further comprises extracting connected components using an image processing algorithm based on graphic theory such that for each pixel of the captured images, the algorithm checks value neighbors to isolate or merge pixels in the captured image research area.

3. The method of raindrop detection according to claim 2, wherein rejecting edges further comprises rejecting extracted connected components that have geometric criteria different from geometric criteria of raindrops.

4. The method of raindrop detection according to claim 2, wherein rejecting edges further comprises rejecting extracted connected components that are inclined over a predetermined angle threshold.

5. The method of raindrop detection according to claim 2, wherein rejecting edges further comprises rejecting extracted connected components showing a grey level variation different from a raindrop grey level variation having one minimum and one maximum.

6. The method of raindrop detection according to claim 2, wherein rejecting edges further comprises rejecting extracted connected components having a predetermined pixels number with a grey level higher than a predetermined grey level threshold.

7. The method of raindrop detection according to claim 6, wherein extracted connected components are rejected only if a speed of the vehicle is below a predetermined speed threshold.

8. The method of raindrop detection according to claim 6, wherein rejecting edges further comprises, if more than two extracted connected components are rejected when extracted connected components having a predetermined pixels number with a grey level higher than a predetermined grey level threshold are rejected, within a predetermined distance threshold in a critical research area, extracted connected components between them are rejected.

9. The method of raindrop detection according to claim 2, further comprising:
   a tracking step in which each extracted connected components in a current captured image is tracked in a next captured image by performing a comparison between the selected extracted connected components grey level and the grey level of corresponding position in the next captured image.

10. A method of raindrop detection on a vehicle windscreen by capturing images using a camera which is at least focused on the windscreen, including a step of detecting edges in a research area of said captured images, wherein the method comprises a rejection step (103) in which edges that are uncharacteristic with respect to a raindrop are rejected, the rejection step comprising at least the following sequence:
   a first stage comprising selecting closed edges and rejecting unclosed edges;
   a second stage comprising extracting connected components from among the selected closed edges;
   a third stage comprising rejecting, among the extracted connected components, extracted connected components that have geometric criteria different from geometric criteria of raindrops;
   a fourth stage comprising rejecting, among the remaining extracted connected components, extracted connected components that are inclined over a predetermined angle threshold;
   a fifth stage comprising rejecting, among the remaining extracted connected components, extracted connected components showing a grey level variation different from a raindrop grey level variation having one minimum and one maximum;
   a sixth stage comprising rejecting, among the remaining extracted connected components, extracted connected components having a predetermined pixels number with a grey level higher than a predetermined grey level threshold; and
   a seventh stage where among the extracted connected components rejected by said sixth stage, if more than two rejected extracted connected components are detected within a predetermined distance threshold in a critical research area, extracted connected components between them are rejected.

11. A driving assistance device comprising:
   a camera mounted onboard a vehicle and which is at least focused on a windscreen of the vehicle; and
   a computer processor configured to:
      capture images from said camera,
      generate at least one signal indicative of the presence of raindrops on the windscreen from information contained in the captured images,
      detect edges in the captured images, and
      reject edges that are uncharacteristic with respect to a raindrop.

12. The driving assistance device according to claim 11, wherein said camera comprises a bifocal objective providing a first zone that is focused to infinity and a second zone focused on the windscreen to detect raindrops.

* * * * *